S. Arnold,
Cage Trap.
No. 104,406. Patented June 21. 1870.

Witnesses:
A. W. Almquist
L. S. Mabee

Inventor:
S. Arnold
per Munn & Co
Attorneys.

United States Patent Office.

SAMUEL ARNOLD, OF SILVER SPRINGS, TENNESSEE.

Letters Patent No. 104,406, dated June 21, 1870.

IMPROVED ANIMAL-TRAP.

The Schedule referred to in these Letters Patent and making part of the same.

*To all whom it may concern:*

Be it known that I, SAMUEL ARNOLD, of Silver Springs, in the county of Wilson and State of Tennessee, have invented a new and useful Improvement in Animal-Traps; and I do hereby declare that the following is a full, clear, and exact description thereof, which will enable others skilled in the art to make and use the same, reference being had to the accompanying drawing forming part of this specification.

This invention relates to a new and useful improvement in traps for catching rats or other animals, birds, or fishes, and consists in the combination of parts arranged to operate as hereinafter more fully described.

In the accompanying drawing—

Similar letters of reference indicate corresponding parts.

Figure 1:
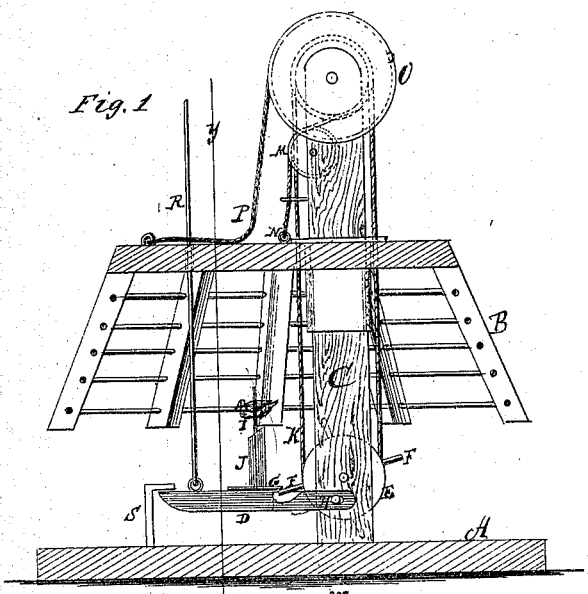
Figure 1 is a vertical section of the trap, on the line $x\ x$ of fig. 2.

A is a platform or bed-plate, upon which the cage closes.

B is the cage, made of any suitable material or materials, either open, as represented in the drawing, or with closed sides, or with sides partially closed, and in any form.

C is a post or pillar, firmly attached to the bed-plate A.

The cage is made to move up and down on this pillar, and is governed in its position by it, so that it rises and falls on the same vertical line.

D is the pan or tripping-platform of the trap.

E is a pulley, placed in the recess in the pillar, near the bed-plate.

In the periphery of this pulley are four, more or less, pins or wires, F, one of which pins is made to catch under a plate, G, on top of the pan D, when the trap is set, as seen in fig. 1.

The pan is pivoted to the pillar, as seen at H.

I represents the bait, attached to the wires on the stand J.

K is a cord, by means of which the cage is suspended.

One end of this cord is attached to the pulley E, around which pulley a turn or two is taken, and the cord is then carried up in a groove in one side of the pillar, and over and around the pulley L, and from L down to the top of the cage.

M is a guide-pulley for throwing the cord clear of the pillar.

The cord is attached to the cage at the point N.

O is a pulley on outer end of the shaft of the pulley L, to which the cord P is attached.

The cage is raised for setting the trap by means of this cord, as it will be seen that, in raising the cage, the pulley E is revolved, and one of the wires F is brought into position for engaging with the plate G, as seen in fig. 1, the pan D being raised for the purpose by means of a wire, R.

S is a stop-hook, to prevent the pan from being raised too high.

By this arrangement the suspension of the cage depends upon the contact of the wire F with the plate G, and that any weight on the pan D, or any force exerted to pull the bait I from the wires, will depress the outer end of the pan and spring the trap. When this is done the cage drops to the bed-plate by its own gravity, and secures the animal or game.

By means of the wires F in the pulley E, the cage may be raised more or less, as may be desired.

This trap may be used under water, for taking fish, with some slight modifications in its construction to adapt it to that purpose.

Figure 2:
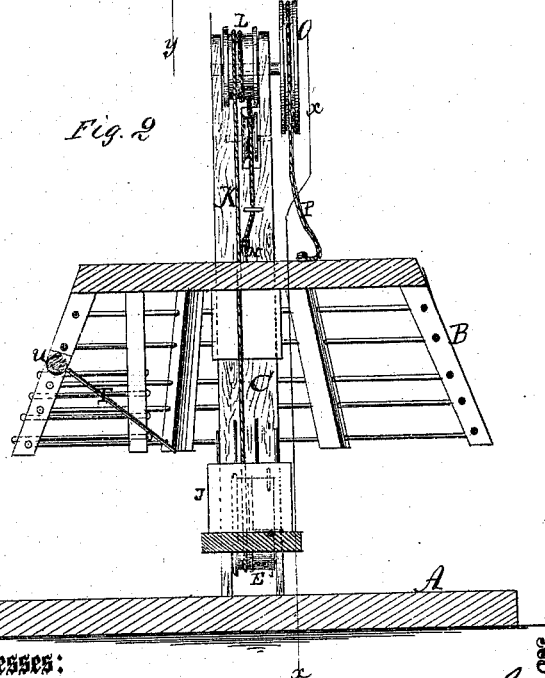
Figure 2 is a vertical section, through the line $y\ y$ of fig. 1.

On one side of the cage is an entrance for rats or other animals. This entrance is protected or closed by a fall, T, as seen in fig. 2, which is pivoted at the point $u$, so that its inner end (with sharp wire teeth) will raise and admit the animal, but will not allow him to escape.

This arrangement adapts the trap for use when the cage is down, and after the trap has been sprung.

Having thus described my invention,

What I claim as new, and desire to secure by Letters Patent, is—

The pulleys E and L, pan D, wires F, plate G, and cord K, arranged and operating in combination with the cage B, substantially as and for the purposes described.

SAMUEL ARNOLD.

Witnesses:
   JAS. M. EAGAN,
   H. S. WHERRY.